United States Patent
Rutter, Jr. et al.

(10) Patent No.: US 10,902,983 B2
(45) Date of Patent: Jan. 26, 2021

(54) PPTC COMPOSITION AND DEVICE HAVING LOW SWITCH TEMPERATURE AND SHARP CRYSTALLIZATION BEHAVIOR

(71) Applicant: Littelfuse, Inc., Chicago, IL (US)

(72) Inventors: Edward W. Rutter, Jr., Pleasanton, CA (US); Yuriy B. Matus, Pleasonton, CA (US); Martin Pineda, Fremont, CA (US)

(73) Assignee: Littelfuse, Inc., Chicago, IL (US)

(*) Notice: Subject to any disclaimer, the term of this patent is extended or adjusted under 35 U.S.C. 154(b) by 0 days.

(21) Appl. No.: 16/941,920

(22) Filed: Jul. 29, 2020

(65) Prior Publication Data

US 2020/0357543 A1   Nov. 12, 2020

Related U.S. Application Data

(62) Division of application No. 16/252,650, filed on Jan. 20, 2019, now Pat. No. 10,784,026.

(51) Int. Cl.

| | |
|---|---|
| *H01C 7/02* | (2006.01) |
| *H01C 1/14* | (2006.01) |
| *H01C 17/065* | (2006.01) |
| *C09D 11/037* | (2014.01) |
| *C09D 11/36* | (2014.01) |
| *H01C 7/00* | (2006.01) |
| *C09D 11/52* | (2014.01) |
| *C09D 11/38* | (2014.01) |
| *C09D 11/102* | (2014.01) |
| *C09D 11/104* | (2014.01) |
| *C09D 11/033* | (2014.01) |
| *C09D 11/322* | (2014.01) |

(52) U.S. Cl.
CPC .......... *H01C 7/028* (2013.01); *C09D 11/033* (2013.01); *C09D 11/037* (2013.01); *C09D 11/102* (2013.01); *C09D 11/104* (2013.01); *C09D 11/322* (2013.01); *C09D 11/36* (2013.01); *C09D 11/38* (2013.01); *C09D 11/52* (2013.01); *H01C 1/1406* (2013.01); *H01C 7/005* (2013.01); *H01C 7/022* (2013.01); *H01C 17/06513* (2013.01)

(58) Field of Classification Search
CPC ...... H01C 7/028; H01C 1/1406; H01C 7/005; H01C 7/22; H01C 17/06513; C09D 11/104; C09D 11/033; C09D 11/108
See application file for complete search history.

(56) References Cited

U.S. PATENT DOCUMENTS

| | | | |
|---|---|---|---|
| 2005/0206494 A1 | 9/2005 | Ko et al. | |
| 2008/0045654 A1* | 2/2008 | Richard | A61K 47/58 525/58 |
| 2010/0213189 A1* | 8/2010 | Keite-Telgenbuescher | H05B 3/845 219/548 |
| 2011/0096388 A1 | 4/2011 | Agrawal | |
| 2016/0310924 A1* | 10/2016 | Nakatomi | H01M 4/0404 |

(Continued)

*Primary Examiner* — Kyung S Lee
(74) *Attorney, Agent, or Firm* — Kacvinsky Daisak Bluni PLLC

(57) ABSTRACT

A PPTC device is provided. The PPTC device may include a first electrode and a second electrode, disposed opposite the first electrode. The PPTC device may include a PPTC layer, disposed between the first electrode and the second electrode, the PPTC layer comprising a polymer matrix formed from a thermoplastic polyurethane (TPU) material.

7 Claims, 4 Drawing Sheets

(56) References Cited

U.S. PATENT DOCUMENTS

2017/0158898 A1\* 6/2017 Xiao .................... C09D 11/104
2017/0291147 A1\* 10/2017 Tang .................... B01D 53/228
2018/0019505 A1 1/2018 Wu
2019/0222040 A1 7/2019 Guo \* cited by examiner

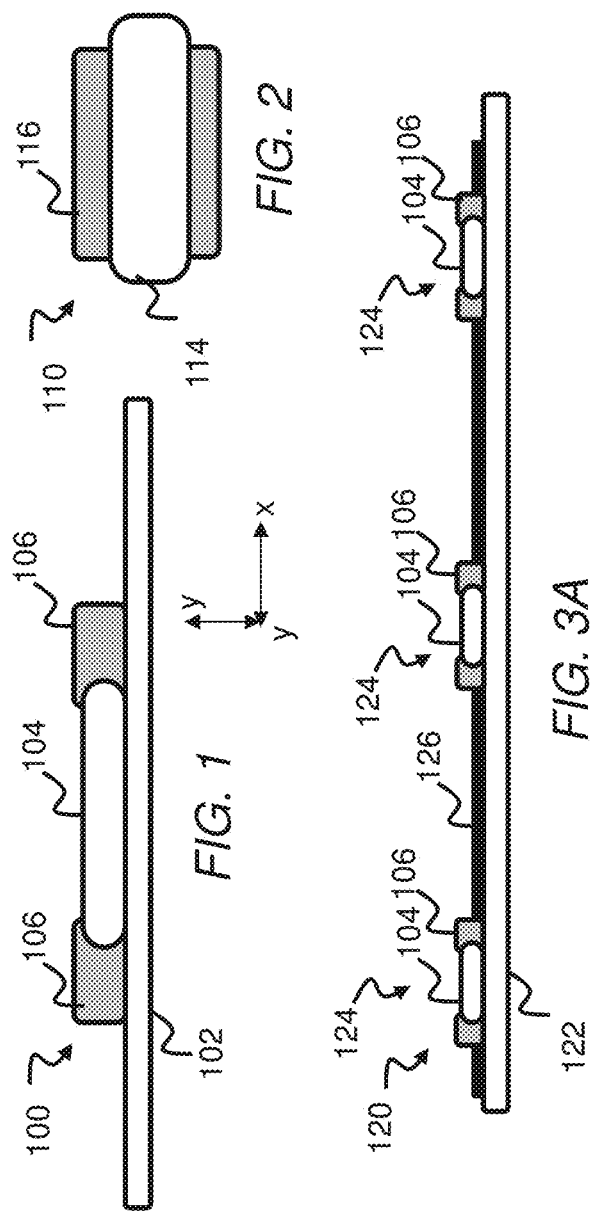

PPTC COMPOSITION AND DEVICE HAVING LOW SWITCH TEMPERATURE AND SHARP CRYSTALLIZATION BEHAVIOR

CROSS REFERENCE TO RELATED APPLICATION

This application is a divisional of, and claims the benefit of priority to, U.S. patent application Ser. No. 16/252,650, filed Jan. 20, 2019, entitled "PPTC COMPOSITION AND DEVICE HAVING LOW SWITCH TEMPERATURE AND SHARP CRYSTALLIZATION BEHAVIOUR," which application is incorporated herein by reference in its entirety.

BACKGROUND

Field

Embodiments relate to the field of circuit protection devices, including fuse devices.

Discussion of Related Art

Polymer positive temperature coefficient (PPTC) devices may be used as overcurrent or over-temperature protection device, as well as current or temperature sensors, among various applications. For example, a PPTC device may include a polymer material and a conductive filler that provides a mixture that transitions from a low resistance state to a high resistance state, due to changes in the polymer material, such as a melting transition or a glass transition. At such a transition temperature, sometimes called a trip temperature, where the trip temperature may often range from room temperature or above, the polymer matrix may expand and disrupt the electrically conductive network, rendering the composite much less electrically conductive. This change in resistance imparts a fuse-like character to the PPTC materials, which resistance may be reversible when the PPTC material cools back to room temperature.

For many applications, a sharp transition in electrical conductivity as a function of temperature is useful. This sharp electrical transition in turn depends upon a sharp transition in state of the polymer matrix forming the PPTC device. For high temperature switch applications, where the trip temperature is above 100° C., many different polymer compositions are known, including polyethylene (PE), polyvinylidene fluoride (PVDF), ethylene tetrafluoroethylene (ETFE) based polymers, aromatic polyamides, and others. Each of these polymer systems is characterized by a semicrystalline or crystalline polymer, exhibiting a relatively well-defined melting point, to impart a sharp switching behavior. In addition, the crystallization behavior as the PPTC switch cools is relatively well defined, leading to the ability to reuse such materials for multiple switching events. However, the development of low temperature PPTC devices suffers from a lack of polymers having well defined melting and crystallization behavior below 100° C.

BRIEF SUMMARY

In one embodiment, a PPTC device material is provided. The PPTC device may include a first electrode and a second electrode, disposed opposite the first electrode. The PPTC device may include a PPTC layer, disposed between the first electrode and the second electrode, the PPTC layer comprising a polymer matrix formed from a thermoplastic polyurethane (TPU) material.

In another embodiment, a method of forming a PPTC device may include forming a polymer matrix material, based upon a polycaprolactone material or a thermoplastic polyurethane (TPU) material. The method may include dissolving the polymer matrix material in a solvent to form a polymer mixture, mixing a conductive filler into the polymer mixture to form an ink, and applying the ink to a substrate.

In a further embodiment, a polymer positive temperature coefficient (PPTC) device may include a tape, a first electrode, disposed on the tape, and a second electrode, disposed on the tape. The PPTC device may further include a PPTC film, disposed on the tape, between the first electrode and the second electrode, the PPTC film comprising a polymer matrix material, formed from a thermoplastic polyurethane (TPU) material.

BRIEF DESCRIPTION OF THE DRAWINGS

FIG. 1 depicts a side view of a PPTC device, according to embodiments of the disclosure;

FIG. 2 depicts a side cross-sectional view of another PPTC device, according to embodiments of the disclosure;

FIG. 3A depicts a side cross-sectional view of another PPTC device, according to other embodiments of the disclosure;

DESCRIPTION OF EMBODIMENTS

Figure 3B:
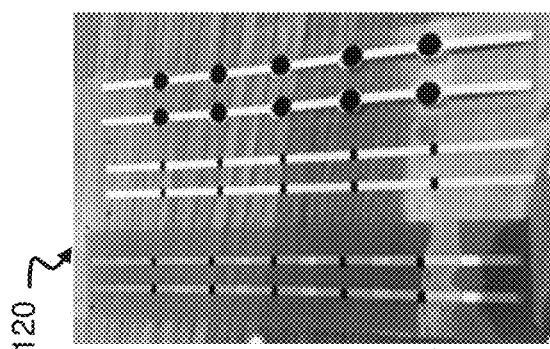
FIG. 3B depicts a top plan view of some variants of the PPTC device of FIG. 3A.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments novel methods and compositions are provided for forming PPTC devices, including low temperature sensors, fuses, and other devices for protecting batteries, circuit boards, FET, and diodes, as examples. According to some embodiments, a device is provided with a switch temperature in the range of 50° C. to 70° C. Moreover, in some embodiments compositions are provided that generate a reset or crystallization temperature below the switch temperature, including fast reset materials, as discussed below. In accordance with various embodiments, PPTC materials are provided that exhibit acceptable solubility in a range of solvents, enabling use in inks, and accordingly facilitating low cost manufacturing processes, and compatibility with a variety of substrates (flexible, thermally sensitive or rigid) and conductors. As such, the present embodiments provide the potential for using materials sensitive to high temperature or oxygen, since just low temperature baking may be employed to remove solvent and reflow polymer.

In various embodiments PPTC devices are fabricated based on adhesive type materials, where these materials may be generally tacky and difficult to compound, and may exhibit partial crystallinity, such as relatively low crystallinity. Accordingly, such materials have not been previously considered for PPTC applications.

According to various embodiments of the disclosure, PPTC devices are provided based upon poly(caprolactone) or PCL. PCL exhibits an approximate 60° C. melting point, providing the potential to fabricate low temperature sensors or switches. In some embodiments, PPTC materials and devices are provided based upon copolymers derived from caprolactone. In some embodiments, polyurethanes based upon PCL are provided, while in further embodiments, polyurethanes based upon other materials such as polyesters are provided.

In particular embodiments, a PPTC material is formed from a thermoplastic polyurethane (TPU), as detailed below. Generally, a TPU is a block copolymer based a polyol or long chain diol, a chain extender or short chain diol, and a diisocyanate. A soft block of the copolymer is built from the polyol and isocyanate, while a hard block of the copolymer is built from the chain extender and isocyanate. This combination imparts elastomeric properties as well as tough properties. Generally, three classes of TPUs are known: polyester based, polyether-based, and polycaprolactone-based. In a TPU, the hard block portion may represent a crystalline region, where the crystalline region may undergo a reversible melt transition, during which transition, individual hard block components on different polymer chains disassociate from one another during heating above the melt temperature, and re-associate with one another and recrystallize into a block upon cooling below the melt temperature.

As detailed below, in some embodiments, a PPTC material is formed from polymers including building blocks such as caprolactone, polycaprolactone, urethanes, polyurethanes, polyols, diols, and other materials. Such polymers may be copolymers having caprolactone, urethane, polyol and other units incorporated into polymer chains. In particular embodiments, a suitable level of cross-linking may be imparted into the PPTC polymer materials to provide mechanical stability during use.

By incorporating the appropriate amount of conductive or semiconducting particles into a caprolactone-based polymer, and/or a TPU-based polymer, low to high resistance (PPTC anomaly effect) switches may be produced, where switching behavior is correlated to a melt transition in the polymer, as detailed in the embodiments to follow.

Turning to FIG. 1, there is shown a PPTC device 100, in side view, according to embodiments of the disclosure. The PPTC device 100 may include a substrate 102, a PPTC device layer 104, and opposing electrodes, shown as electrodes 106. In some embodiments, the substrate 102 may be a flexible substrate, such as a tape. The opposing electrodes may be disposed in a manner wherein both of electrodes are disposed on the substrate 102, while the PPTC device layer 104 is also disposed on the substrate 102. As such, at a given switch temperature, the PPTC device 100 may act to create a resistance increase for current generally flowing parallel to the plane of the substrate 102, such as along the x-axis. According to embodiments of the disclosure, the PPTC device layer 104 may include a caprolactone based polymer and conductive filler, or a TPU-based polymer and conductive filler, and may exhibit a melting temperature in the range of 50° C. to 70° C. As such, the PPTC device 100 may be used for various applications where a switch temperature in the range of 50° C.-70° C. is useful, including as sensors in battery devices.

FIG. 2 presents another PPTC device, shown as PPTC device 110. In this case, a pair of electrodes, shown as electrodes 116, are disposed on opposite sides of a PPTC device component 114, such as a caprolactone-based or TPU-based polymer material, with the appropriate conductive filler. As such, the PPTC device 110 may act as a low temperature sensor or switch to increase resistance of current traveling along the z-axis.

Turning to FIG. 3A, there is shown another PPTC device PPTC device 120, in side view, according to embodiments of the disclosure. FIG. 3B depicts a top plan view of some variants of the PPTC device 120, showing a linear array of PPTC components 124, arranged on a tape substrate.

The PPTC device 120 may include a tape 122, acting as a substrate, upon which substrate a plurality of PPTC components are affixed. As an example, a plurality of PPTC components, arranged generally as described for FIG. 1, are arranged in electrical series and are affixed to the tape 122. The PPTC components may be electrically connected to one another using a conductor 126, arranged along the surface of the tape 122. The switching temperature of the PPTC components 124 may be in the range of 50° C. to 70° C., so the PPTC device 120 may be used for applications requiring current to be limited above approximately 50° C. to 70° C. In particular embodiments, the PPTC device 120 may be applied to another component or device to be protected, such as a battery or battery pack, where operation is to be limited below a design temperature, such as 60° C. In some instances, the tape 122 may be affixed to various different locations of a battery or battery pack, to monitor temperature at the various different locations, using one of the PPTC components 124 to monitor temperature at each location.

Figure 4:
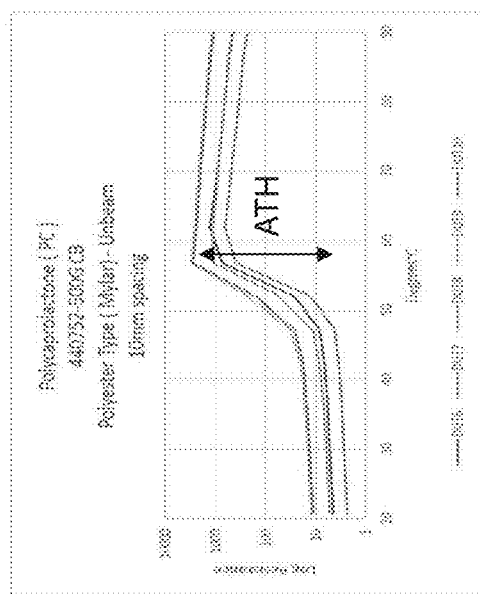
FIG. 4 depicts a graph showing electrical resistance as a function of temperature for a reference material and another set of PPTC materials arranged according to embodiments of the disclosure.

Turning now to FIG. 4, there is shown the results of electrical resistance measurements for a series of PPTC devices, arranged according to embodiments of the disclosure. In this example, the PPTC devices are formed from PPTC components based upon polycaprolactone PPTC material, having a switch temperature of approximately 55° C., as shown. In these sample, the autothermal height (ATH), meaning the logarithm of the resistance ratio between low temperature and high temperature states, is approximately 2.4. Thus, resistance increases by over two orders of magnitude as the PPTC components experience a melt transition at approximately 55° C., taking place over a temperature range on the order of 10 degrees C. This resistance change may be adequate for certain applications, such as sensor applications. Notably, in applications where mechanical stability and integrity of a PPTC device is to be maintained over multiple instances where switching is to be performed, a given degree of cross-linking of the polycaprolactone material may be called for. In these circumstances, cross-linking may be accomplished by exposing the PPTC material to radiation as one approach. The embodiments are not limited in this context.

In particular embodiments of the disclosure, a cross-linking promotor may be added to caprolactone to promote cross-linking when exposed to radiation. For example, triallyl cyanurate (TAC) or triallyl isocyanurate (TAIC) may be added in small amounts to caprolactone to promote cross-linking. As is known, a fraction such as 1% by weight of TAIC may promote cross-linking of polycaprolactone at absorbed doses as little as 20 kGY, where cross-linking as high as 80% may be observed. Without TAIC caprolactone may remain essentially uncrosslinked (0%) at such absorbed doses.

Notably, in some embodiments, the switching temperature close to 60° C. may be tuned to some extent by using different crosslinking schemes such as a catalyst or exposure to a radiation beam such as electron beam radiation. In some instances, as shown for example, at FIG. 4, as the temperature increases well above the melting temperature, the PPTC material shows a minor negative temperature coefficient (NTC effect), but this effect may be eliminated by radiation crosslinking (electron beam or gamma ray radiation).

Moreover, to improve crystallization behavior, the polycaprolactone may be synthesized to have a relatively lower molecular weight, such as below 20,000, and in some cases approximately 14,000. Moreover, the polycaprolactone may be synthesized having a narrow molecular weight distribution (which distribution may be characterized by a ratio of weight average molecular weight to number average molecular weight), such as below 1.5 in order to improve the sharpness of the switching transition.

While cross-linking of caprolactone by exposure to radiation dose may be promoted by TAIC, the cross-linking generally may also reduce the value of ATH for PPTC materials based upon pure caprolactone. Thus, in accordance with further embodiments of the disclosure, for applications where cross-linking is needed for stabilizing a PPTC device based on a caprolactone material, additional components may be added to the caprolactone.

In accordance with various embodiments of the disclosure, a PPTC material may include a copolymer based upon caprolactone and a known thermoplastic urethane-based monomer. Known thermoplastic urethane (TPU) containing PCL is used in many applications such as adhesives. In some embodiments, the copolymer may further include a polyol-based material.

Figures 5A, 5B:
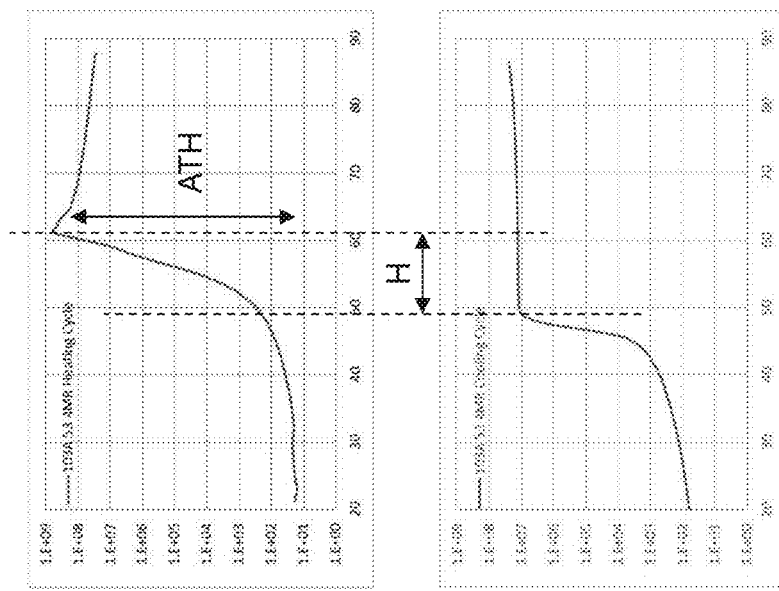
FIG. 5A depicts a graph showing electrical resistance as a function of temperature during heating for a further PPTC material arranged according to embodiments of the disclosure.
FIG. 5B depicts a graph showing electrical resistance as a function of temperature during cooling for the PPTC material of FIG. 5A.

FIG. 5A and FIG. 5B illustrate the electrical resistance behavior of a PPTC material arranged according to additional embodiments of the disclosure. In this example, the PPTC material is a low temperature TPU copolymer including a combination of diisocyanate, bio-based polyol, such as castor or soybean oil, and chain extender diol (such as 1,4 butanediol).

More particularly, the PPTC material is formed of a mixture of 30% conductive filler and 70% polymer matrix, where the polymer matrix is a commercially available polymer—Pearlbond™ ECO 590, made by Lubrizol Advanced Materials, Inc. As shown in FIG. 5A, the switch temperature is approximately 55° C., with an ATH of approximately 7, meaning resistance increases by approximately 7 orders of magnitude upon switching to the high temperature state. Moreover, as shown in FIG. 5B, the reset to a low resistance state upon cooling does not take place until approximately 48° C. The difference between the temperature where transition to the high resistance state is complete (61° C.) upon heating, and the temperature where the transition to the low resistance state starts upon cooling (48° C.) is greater than 10° C.

This switch hysteresis between transition from high to low resistance depending upon whether the sample is being heated or cooled, provides an extra measure of safety in that the high resistance state is maintained far below the switching temperature, so that a device become protected does not go back "on" until the crystallinity is re-established over 12° C. below the switching temperature. Said differently, in a circuit where current is limited by the PPTC device being in the high temperature high resistance state, the high resistance state is maintained below the switch temperature as the PPTC device cools, thus limiting current through a device or circuit being protected until the temperature is much lower than the switch temperature.

As further shown in FIG. 5B, at a recrystallization temperature the recrystallization behavior is very sharp. Without limitation as to a particular theory it is believed that the combination of the aromatic polyurethane and the bio-based polyol portion of the copolymer matrix may cause the PPTC material to recrystallize extremely rapidly, thus permitting the PPTC device to respond quickly as the PPTC device is cycled from low to high temperature and back.

In other embodiments, PCL based polymeric materials may be used for low temperature PTC material, including known adhesive materials such as Pearlbond™ 100, Pearlbond™ 103, Pearlbond™ 220, Pearlbond™ 223 and Pearlbond™ DIPP 119.

According to different embodiments of the disclosure, a caprolactone-based PPTC material or TPU-based PPTC material may be prepared using known preparation methods. In various embodiments, to prepare a PPTC material, firstly polycaprolactone or a TPU material may be dissolved in a number of solvents, especially aromatic solvents such as toluene, xylene, mesitylene, anisole or mixtures thereof. Such solutions may be mixed with conductive materials such as carbon-based conductors carbon black, graphite nanotubes or graphene, tungsten carbide, titanium carbide, nickel, copper or other metals, or semiconductors (doped ZnO, MnOx, FeOx, NiOx, tin oxides, other sulfides, tellurides etc.) to form conductive composites to act as a PPTC material after drying.

In some methods according to the present embodiments, the appropriate amount of caprolactone-based or TPU based polymer to act as a polymer matrix is mixed with the appropriate amount of carbon black to generate a final volume percent of polymer to carbon black in the ratio of 70/30. In one particular example Pearlbond™ ECO 590 is first dissolved in xylene to form a polymer solution, while carbon black is added to the polymer solution to generate the final 70/30 volume ratio after drying These type of polymer materials have the advantage in that compounding by standard means is readily performed (e.g., Brabender, twin screw, or other means) to produce a polymer slab that can be used directly (punched and melted onto interdigitated electrodes) or laminated between metal foils. These materials can be press laminated at relatively low temperatures such as 120° C., helping to preserve the properties of the materials present in the formulation with minimal change in properties. Furthermore, material may also be mixed or compounded and dispensed via heated syringe due to the low melting point of the material. In addition, a slab of PPTC material may be cut or punched to any desired form factor and interconnected to a device by standard methods.

After formulation, these materials may be useful for both PTC and NTC materials and devices. Because the switching temperature of these devices is generally in the range of 60° C., processing of PPTC devices including materials that may oxidize or react with oxygen or water at high temperature is possible, since the high temperatures required for traditional compounding are avoided.

This low temperature processing capability further facilitates using polymer solutions or inks to be made that can be applied by any standard techniques, such as direct liquid dispense, screen printing, stencil printing, ink jet printing etc. Low viscosity solutions may be prepared using relatively higher solvent levels, while thicker materials can be prepared by using higher polymer solids levels (i.e., solutions having less solvent). Material compatibility has been demonstrated (pellets can be dissolved) using either xylene or anisole at up to 50 wt % levels. This compatibility permits use in a variety of low-cost applications.

Furthermore, these polymeric materials of the present embodiments precipitate when exposed to other solvents some common such as isopropanol or ethanol. Accordingly, in certain embodiments, a solution of caprolactone-based or TPU based polymer, conductive additive, and solvent may be prepared either as a bulk material or dispensed onto the appropriate substrate, device, or carrier, and subsequently exposed to an alcohol additive such as isopropyl alcohol vapor. In this manner, rapid precipitation of the final PPTC material into bulk material or in-situ on a substrate may be accomplished without the need for a baking or drying process after the PPTC material is dispensed.

Moreover, in embodiments where mechanical integrity and repeated use of a PPTC switch is called for, copolymers of a TPU, as described above show several advantages over pure polycaprolactone PPTC devices. The copolymers as described above form high quality polymer slabs, while homopolymer PCL slabs are relatively brittle and fracture when pressed rendering the homopolymer slabs difficult to process using stamping or pressing techniques. Moreover, the copolymers formed from a diisocyanate, polyol, and diol differs from a PCL homopolymer in that the copolymer shows superior performance when compounded without Prorad additives (materials that promote radiation crosslinking).

In other embodiments of the disclosure, any suitable ester containing monomer may be incorporated to provide other functionality in addition to the poly(caprolactone) or polyester, as well as other urethane functionality to tailor the properties of these materials.

Figure 6:
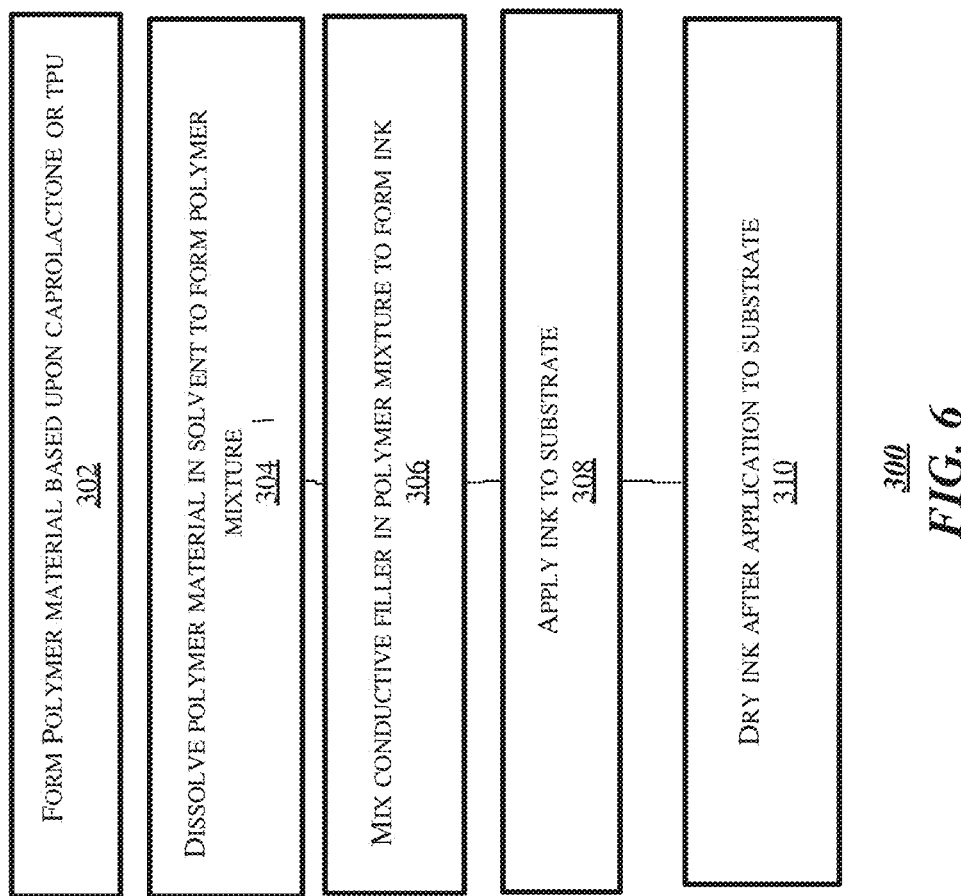
FIG. 6 depicts a process flow according to other embodiments of the disclosure.

Turning now to FIG. 6 there is shown an exemplary process flow 300. At block 302, a polymer material is formed based upon caprolactone or a TPU. In some instances, the polymer material may be a homopolymer of polycaprolactone. In other examples, the polymer material may be a copolymer, including a low temperature thermoplastic urethane-forming material. In particular embodiments, the polyol may be a bio-based polyol, including castor oil, or soybean oil.

At block 304, the polymer material is dissolved in a solvent. Suitable solvents include aromatic solvents such as toluene, xylene, mesitylene, anisole or mixtures thereof. In one approach, the polymer material is provided in powder form or as pellets that are mixed with solvent either by use of a speed mixer, by rolling, or by sonication. In some variants, the mixing takes place without heating, while in other variants the mixture is heated to temperatures as high as 80° C. in order to accelerate the dissolution rate of the polymer material.

At block 306, conductive filler is mixed in with the polymer mixture to form an ink. In various embodiments, the conductive filler may include a carbon material, a metal, a conductive ceramic material, conductive oxide, semiconductor, and so forth. The amount of conductive filler may be chosen to generate an overall volume fraction of conductive filler of 5% to 80% after removal of solvent from the ink. Generally, the polymer material is dissolved first in a solvent before block 306 to ensure uniformity and then the conductive material is added at block 306, though the conductive filler may be added to polymer before block 304 in some embodiments.

In some variants the mixing, in of the conductive filler is accomplished by known processes such as speed mixing, sonication, rolling, heating, and so forth. Speed mixing using a ceramic slug is useful for rapid sample preparation and provides significant stirring action. Sonication provides an excellent option in order to drive bubbles out of the polymer/conductive filler solution, so the final PPTC material does not incorporate bubbles that otherwise would degrade electrical performance.

At block 308, the ink is applied to a substrate. In some embodiments, the ink may be dispensed on a substrate that includes circuitry, including, for example, opposed electrodes, arranged on a tape or other substrate. Thus, the ink may be dispensed over regions of the substrate where oppose electrodes are located, such as interdigitated electrodes, in the region filling the gap between electrodes.

At block 310, the ink is dried after dispensing on the substrate. In some embodiments, where the ink is deposited as a layer, the ink is heated for a duration of 10-30 minutes in an oven to dry to a solid film form. In some variants, the drying of the ink may be accomplished by first allowing the solvent within the ink to evaporate at ambient temperature, prior to a second phase where heating is performed. This two-phase approach my help avoid bubble formation. In a further variant, ink drying may be performed by performing a low temperature bake at 60° C., for example, prior to a final 120° C. bake, for example.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A method of forming a PPTC device, comprising:
    forming a polymer matrix material, based upon a polycaprolactone material or a thermoplastic polyurethane (TPU) material;
    dissolving the polymer matrix material in a solvent to form a polymer mixture;
    mixing a conductive filler into the polymer mixture to form an ink;
    applying the ink to a substrate;
    maintaining the substrate at room temperature for a duration of at least 30 minutes, whereby a first portion of the solvent is evaporated; and heating the substrate to a temperature of 60° C. to 150° C., whereby a second portion of the solvent is evaporated.

2. The method of claim 1, the applying comprising: performing a direct liquid dispense, screen printing, stencil printing, or ink jet printing.

3. The method of claim 1, wherein the solvent comprises xylene, mesitylene or anisole, having a weight percent of up to 80 wt %.

4. The method of claim 1, further comprising exposing the ink to an alcohol additive.

5. The method of claim 1, further comprising: before the mixing the conductive filler, mixing the polymer matrix material with the solvent using a speed mixer, a rolling mixer, or a sonification tool, at a mix temperature between room temperature and 80° C.

6. The method of claim 1, further comprising exposing the ink to a radiation beam, wherein a portion of the polymer matrix material is crosslinked.

7. The method of claim 1, wherein the polymer matrix material comprises units derived from diisocyanate, a bio-based polyol, and chain extender diol.

\* \* \* \* \*